Dec. 10, 1929.  W. L. WRIGHT  1,738,630
WAX LIKE PRODUCT AND THE METHOD OF PRODUCING THE SAME
Filed Dec. 7, 1925
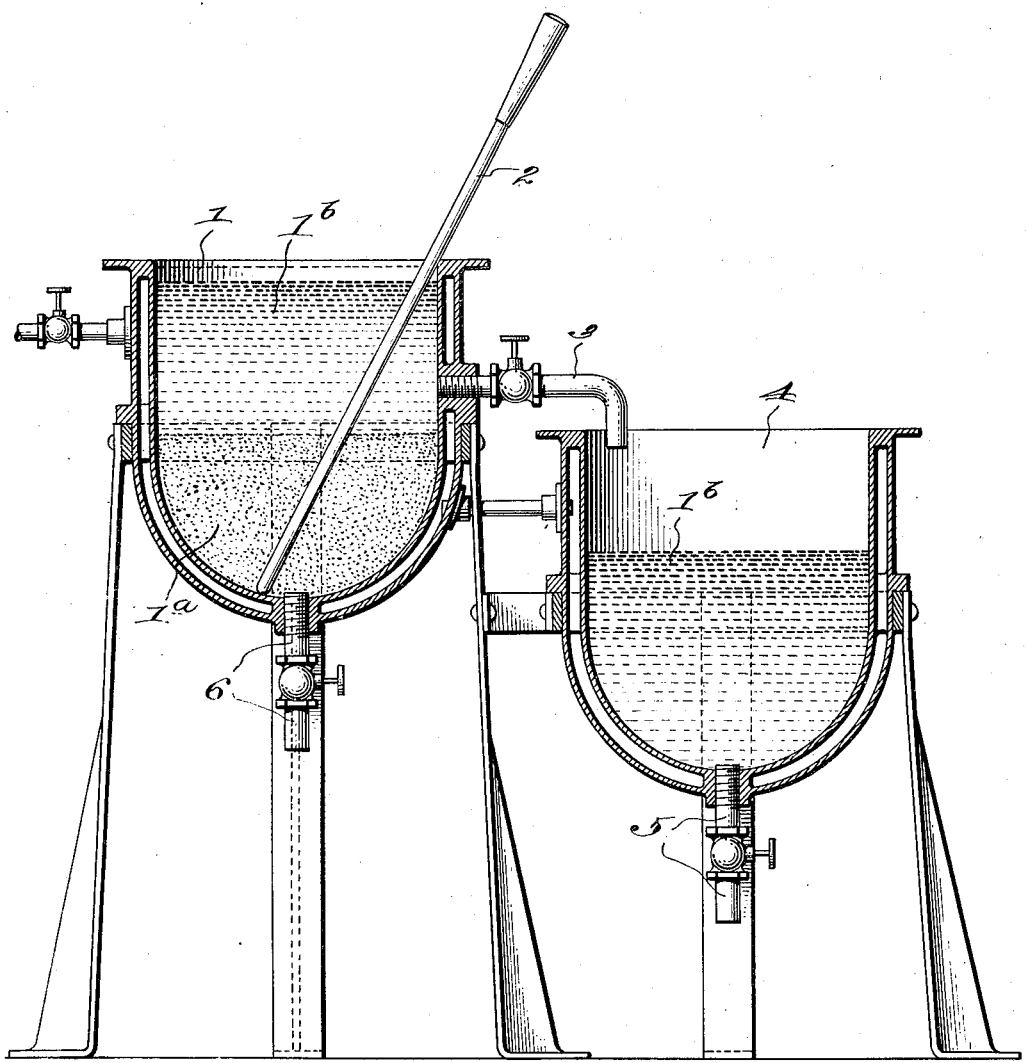
Inventor
Wilbur L. Wright
By
Herbert Peck   Attorney Patented Dec. 10, 1929

1,738,630

UNITED STATES PATENT OFFICE

WILBUR L. WRIGHT, OF FULTON, NEW YORK, ASSIGNOR TO OSWEGO FALLS CORPORATION, OF FULTON, NEW YORK, A CORPORATION OF NEW YORK

WAXLIKE PRODUCT AND THE METHOD OF PRODUCING THE SAME

Application filed December 7, 1925. Serial No. 73,720.

The particular object of this invention is to produce a wax-like product of a lighter color, or more cleanly in appearance, than the wax in its original condition before treatment according to my present invention, and to thus produce a product useful in the industrial arts particularly to serve as a binder for paper hood caps for containers, and other uses where such waxes in their dirty dark-appearing original crude state would be objectionable, and also to produce a wax-like product that includes a small percentage of sulphur whereby such product is somewhat different in certain characteristics from the original wax and is thereby rendered peculiarly advantageous for hood cap binders and other purposes.

With these and other ends in view, the invention consists in treating certain approximately high melting-point waxes, particularly those of vegetable and insect origin, with sulphur, and in the resulting product.

The accompanying drawings, forming a part hereof, show in vertical section, and somewhat diagrammatically, an example of apparatus, from among others, that can be used for carrying out my invention.

In carrying out the invention, the wax in melted or liquid condition is mixed with, or at least brought into intimate contact with a preferably surplus quantity of liquefied sulphur, and as a result of this mixture or contact with sulphur in the liquid state, a waxlike plastic product is produced that when cooled or set is of a pleasing cleanly appearance and in color is lighter than the original hard crude wax before being melted and subjected to the sulphur treatment. Furthermore, the resulting product has gained a sulphur content not present in the original wax, and is of a slightly different melting point from that of the original wax and is also somewhat denser than the original wax.

I melt a suitable quantity of the element sulphur (S) (preferably crude sulphur, although refined sulphur can be used) in the kettle or pot 1. Usually I employ a quantity of sulphur that when melted will be not more than approximately one half the full capacity of the kettle. The sulphur reaches a condition of extreme fluidity somewhere between say 240° or 250° F. and about 300° F.

I also melt the wax, preferably carnauba wax, usually in a separate kettle, although it can be melted in the kettle with the sulphur. This wax is found on the market in the crude state at a price much lower than the so-called refined carnauba wax. The refined carnauba wax of commerce often includes an added ingredient, rendering such refined wax not so desirable for certain industrial uses. The mentioned crude carnauba wax of commerce is dark in color and dirty in appearance, and hence is not desirable for certain industrial uses. The crude carnauba wax has a melting point somewhere about 195° F.

I pour a suitable quantity of the melted crude carnauba wax into the kettle containing the melted sulphur so that the quantity of melted wax then in the kettle with the melted sulphur is approximately equal to or greater than the sulphur content. The relative proportions of wax and sulphur, according to my present experience in carrying on this method, are not material. However, I usually employ approximately equal quantities of sulphur and wax as a matter of convenience.

The mixture of melted sulphur and wax in the kettle is usually stirred or agitated while the temperature of the mixture is maintained below the flash point of the wax and above the temperature at which sulphur is liquefied. In other words, the mixture is heated to a temperature between about 250° or 255° F. and about 300° F. and thus maintained for a short length of time with the sulphur in liquefied condition. The sulphur seems to reach the state of greatest fluidity somewhere about 255° F., although according to my experience no harm is done if the mixture reaches the temperature of about 300° F. or even a slightly higher temperature, but the mixture should be brought to at least the required temperature to thoroughly liquefy the sulphur as well as the wax.

When agitation or stirring ceases, the surplus sulphur, being relatively heavy settles, while the carnauba wax and sulphur product floats above the sulphur and can be drawn off.

This carnauba wax product contains a small percentage of sulphur, usually between 1.2 and 2 percent sulphur, and is light in color and clear and cleanly in appearance, in fact is lighter in color than the expensive refined carnauba wax of commerce.

In the particular example given, for purposes of explanation of a method that can be followed to produce a hard high melting point wax (as distinguished from paraffin wax) containing a modicum of sulphur (in this instance approximately two percent of sulphur), the charge of melted wax is mixed with, or brought into contact with an excess quantity of melted sulphur, to enable the melted wax to take up or absorb the maximum amount of sulphur possible under the conditions then prevailing. By thus providing an excess quantity of sulphur, i. e. more sulphur than I expect any particular charge of wax to absorb or take up, although I do not so wish to limit all features of my invention, I am enabled to employ the charge of liquid sulphur remaining in the kettle for repeatedly treating fresh charges of wax. After such repeated operations, the remaining sulphur becomes discolorated, and is drawn off, and a fresh charge of sulphur is melted in the kettle.

The carnauba wax-sulphur product is not only lighter in color but somewhat denser or of somewhat different texture, than the original or crude carnauba wax.

Carnauba wax, like some of the other hard high melting point waxes, such as candelilla wax as distinguished from paraffin wax, does not form objectionable deposits on smooth glass surfaces, when used for hood cap binding purposes as set forth by my Patent No. 1,603,057, dated Oct. 12, 1926. The carnauba wax-sulphur product of my invention retains this desirable peculiarity.

However, I do not wish to limit my invention to carnauba wax, as other waxes of vegetable and insect origin, particularly the well known hard high melting point waxes, treated in a similar manner with sulphur produce wax-sulphur products of lighter color with a small percent sulphur present in each product, and these wax-sulphur products are of added usefulness by reason of the presence of sulphur for the same purposes for which the respective original waxes were adapted or employed. Candelilla wax, shellac wax, beeswax, Montan wax, when treated with sulphur as herein set forth will produce lighter colored products containing likewise a small percent sulphur and somewhat changed in character, as herein set forth, with respect to the original wax. So far as I have observed, Montan wax is but slightly lightened in color by the sulphur treatment which results in a wax-sulphur product of a dark color which for that reason may not now be desirable for hood cap binder purposes.

My invention does not include paraffin or like mineral products of low melting point and of a soft greasy nature, which as found on the market are of a desirable light color, and which when cooked or treated with sulphur, as herein explained with respect to vegetable and insect waxes, do not take up sulphur as do said vegetable and insect waxes but seem to merely take on the yellow color of the sulphur.

While I prefer to stir or agitate the liquid mixture of wax and sulphur while maintaining said ingredients in liquid condition at a temperature above say about 255° F. and below the flash point of the wax, yet the result sought is attained when the mixture is not stirred.

In the drawings, I show a glass rod 2, as an example of means that can be employed for mixing or agitating the liquefied sulphur and wax.

In the mixing kettle 1, I show the settled surplus liquid sulphur 1$^a$, covered by the liquid light colored wax product 1$^b$, with a normally-closed cut-off or valve controlled spout or discharge 3, opening into the kettle 1, above the surplus sulphur level, so that the light colored wax product 1$^b$, can be drawn off by gravity and discharged into the depressed light colored wax product kettle 4, wherein the liquid product 1$^b$, is shown. The light colored wax product can be drawn from kettle 4, for casting or use, through normally-closed cut-off controlled bottom discharge pipe 5.

The remaining contaminated liquid sulphur can be drawn off from kettle 1, through normally-closed valved-controlled discharge 6.

Any suitable means can be provided for heating the kettles and controlling the temperatures therein, although I happen to show the kettles jacketed for superheated steam.

I desire to produce a waxlike product light and cleanly in color, but I also desire to get into the product the largest possible percentage of the cheap hard product sulphur.

I cannot at this time state exactly what chemical or other action taken place to cause the change in color or the combination, if any, between the sulphur and wax, or whether or not a chemical reaction takes place or whether the sulphur is in the wax in the free state.

No claim is herein made to any product disclosed hereby combined with fibrous or paper material hood caps as a hood cap binder, or otherwise to paper material impregnated with any product disclosed hereby, as such coated or impregnated paper or fibrous material articles are claimed in my application Ser. No. 72,318, filed Nov. 30, 1925, for paper and other fibrous sheet material hood caps.

What I claim is:

1. A light colored wax-like product consisting of carnauba wax and approximately two percent sulphur.

2. A light colored hard high melting point wax-like product comprising a specified wax of vegetable origin, and not more than approximately two percent sulphur.

3. The method of producing a wax-like product from waxes of vegetable and insect origin which comprises the steps of mixing the molten wax with molten sulphur at temperatures between 250° F. and 300° F. approximately, the sulphur being present in excess of the maximum amount that will be taken up by the wax at the temperatures employed, and then separating the wax-like product and the excess sulphur.

4. In the method of producing wax-like products from certain specified waxes of vegetable and insect origin, that step which comprises mixing the molten wax with molten sulphur at temperatures between 250° F. and 300° F. approximately, the sulphur present being at least equal to the maximum amount of sulphur that will be taken up by the wax at the temperatures employed, any sulphur in excess of such amount being then separated from the wax-sulphur product.

5. The process of making a wax-like product, which comprises melting together a wax of vegetable or insect origin with sulfur at temperatures between 250° F. and 300° F., the sulfur being at least equal in amount to the maximum amount that will be taken up by the wax at the temperatures employed.

6. A light-colored wax-like product comprising a wax of vegetable or insect origin, and not more than approximately two percent sulfur.

In testimony whereof I have hereunto set my hand at Fulton, N. Y. this 27 day of Nov., 1925.

WILBUR L. WRIGHT.